United States Patent
Bae et al.

(10) Patent No.: US 9,738,160 B2
(45) Date of Patent: Aug. 22, 2017

(54) FAIL-SAFE METHOD AND APPARATUS FOR HIGH VOLTAGE PARTS IN A HYBRID VEHICLE

(71) Applicant: Hyundai Motor Company, Seoul (KR)

(72) Inventors: Su Hyun Bae, Daegu (KR); Young Kook Lee, Seoul (KR); Seong Yeop Lim, Seoul (KR); Won Kyoung Choi, Gyeonggi-do (KR); Sung Kyu Kim, Gyeonggi-do (KR); Jin Hwan Jung, Gyeonggi-do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 736 days.

(21) Appl. No.: 14/086,205

(22) Filed: Nov. 21, 2013

(65) Prior Publication Data

US 2014/0183941 A1 Jul. 3, 2014

(30) Foreign Application Priority Data

Dec. 31, 2012 (KR) ........................ 10-2012-0158057

(51) Int. Cl.
*B60L 11/18* (2006.01)
*B60L 3/00* (2006.01)
(Continued)

(52) U.S. Cl.
CPC ........... *B60L 3/0069* (2013.01); *B60L 3/0092* (2013.01); *B60L 3/04* (2013.01); *B60L 7/14* (2013.01); *B60L 11/123* (2013.01); *B60L 11/14* (2013.01); *B60L 11/1861* (2013.01); *B60L 11/1868* (2013.01); *B60L 15/007* (2013.01); *B60L 15/20* (2013.01); *B60L 15/2009* (2013.01); *B60L 2210/12* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01);
(Continued)

(58) Field of Classification Search
None
See application file for complete search history.

(56) References Cited

U.S. PATENT DOCUMENTS

| 2010/0145561 A1* | 6/2010 | Song | B60K 6/48 701/22 |
| 2012/0112530 A1* | 5/2012 | Komatsu | B60L 3/003 307/9.1 |
| 2014/0091618 A1* | 4/2014 | Jeong | B60L 3/00 307/10.1 |

FOREIGN PATENT DOCUMENTS

| CN | 102386647 | 3/2012 |
| CN | 102574473 | 7/2012 |

(Continued)

*Primary Examiner* — Jared Fureman
*Assistant Examiner* — Aqeel Bukhari
(74) *Attorney, Agent, or Firm* — Mintz Levin Cohn Ferris Glovsky and Popeo, P.C.; Peter F. Corless

(57) ABSTRACT

A fail-safe method and apparatus for high voltage parts in a hybrid vehicle is provided. In the fail-safe method, it is determined whether or not a high voltage main relay is turned off. Here, when the high voltage main relay is turned off, a voltage is charged into a direct current (DC) link using a counter electromotive force generated in a motor generator linked with a revolution of an engine. Voltage control is performed such that the voltage of the DC link is uniformly maintained using an inverter for the motor generator.

13 Claims, 3 Drawing Sheets

(51) Int. Cl.
  *B60L 3/04*    (2006.01)
  *B60L 7/14*    (2006.01)
  *B60L 11/12*   (2006.01)
  *B60L 11/14*   (2006.01)
  *B60L 15/00*   (2006.01)
  *B60L 15/20*   (2006.01)

(52) U.S. Cl.
  CPC ..... *B60L 2240/549* (2013.01); *B60L 2260/24* (2013.01); *B60L 2260/26* (2013.01); *Y02T 10/645* (2013.01); *Y02T 10/7005* (2013.01); *Y02T 10/7044* (2013.01); *Y02T 10/7066* (2013.01); *Y02T 10/7077* (2013.01); *Y02T 10/7233* (2013.01); *Y02T 10/7241* (2013.01); *Y02T 10/7275* (2013.01); *Y02T 90/34* (2013.01)

(56) References Cited

FOREIGN PATENT DOCUMENTS

| | | | |
|---|---|---|---|
| JP | 2001329884 A | 11/2001 | |
| JP | 2007210413 A | 8/2007 | |
| JP | 2008279978 A | 11/2008 | |
| JP | 2009184559 A | 8/2009 | |
| JP | 2010162996 A | 7/2010 | |
| JP | 2010247725 A | 11/2010 | |
| KR | 10-2008-0087487 A | 10/2008 | |
| KR | 10-2011-0050836 A | 5/2011 | |
| KR | 10-2012-0005746 A | 1/2012 | |
| KR | 10-2012-0064455 A | 6/2012 | |

\* cited by examiner

FAIL-SAFE METHOD AND APPARATUS FOR HIGH VOLTAGE PARTS IN A HYBRID VEHICLE

CROSS-REFERENCE TO RELATED APPLICATION

This application claims under 35 U.S.C. §119(a) the benefit of Korean Patent Application No. 10-2012-0158057 filed Dec. 31, 2012, the entire contents of which are incorporated herein by reference.

BACKGROUND (a) Technical Field

The present disclosure relates to a fail-safe method and apparatus for high voltage parts in a hybrid electric vehicle. More particularly, the present disclosure relates to a fail-safe method and apparatus for high voltage parts in a hybrid electric vehicle, which enables the driving of high voltage parts so as to prevent the driving of the vehicle from becoming impossible due to inoperable high voltage parts.

(b) Background Art

In general hybrid vehicles, a power converter to charge a 12V battery and supply power to 12V electronic loads receives power of a high voltage battery as an input. Accordingly, when there is an abnormality in parts or controllers connected in parallel on a DC-link, a high voltage main relay for relaying a high voltage is turned off, and the power converter does not operate because the power converter cannot receive a normal high voltage input.

When the power converter does not normally operate in the event of an emergency, 12V-based electronic loads entirely consume power from a 12V battery. Accordingly, even though the discharging time varies with the degree of electronic loads, the battery is finally discharged to affect the normal running of a vehicle and thus threaten the safety of a driver.

In an abnormal situation involving a battery and an inverter, if a high voltage is not applied to the power converter, the power converter cannot perform its inherent roles of charging the battery and supplying power to the electronic loads. Accordingly, the electronic loads consume power only from the 12V battery.

When the discharging of the 12V battery occurs during the driving of a vehicle, vehicle controllers receiving power from the battery may stop operating. When the 12V battery is discharged below a certain voltage in an actual vehicle, the control power of the Motor Driven Power Steering (MDPS), which is typically sensitive to the battery discharging, is turned off, and thus the steering wheel is locked, threatening the safety of a driver.

Also, when the high voltage main relay is turned off, various high voltage parts, e.g., an electric oil pump, an air conditioner receiving power from the high voltage battery, etc., become inoperative. Particularly, since parts such as electric oil pumps are installed at a transmission, and cannot generate hydraulic pressure in the transmission when the electric oil pump does not operate, the driving of the vehicle may also be disabled.

In view of the above, Korean Patent No. 10-0877854 (hereinafter, referred to as Reference 1), filed and owned by the present applicant, discloses a method of driving a power converter of a hybrid vehicle in the event of an emergency. Reference 1 discloses a method of charging a 12V battery using an input of a counter electromotive force generated in a driving motor by dualizing a transmission map with respect to normal driving and emergent driving in which a high voltage main relay is turned off. However, this typical fail-safe method using the dualization of the transmission map provides an input high voltage of a power converter through the transmission map dualization when a main relay is turned off, and thus merely enables low voltage battery charging. Also, since there are limitations in stable voltage supply and low output voltage, the various parts using high voltage are difficult to stably drive.

The above information disclosed in this Background section is only for enhancement of understanding of the background of the disclosure, and therefore, it may contain information that does not form the prior art that is already known to a person of ordinary skill in the art.

SUMMARY OF THE DISCLOSURE

The present disclosure provides a fail-safe apparatus and method in preparation for turning-off a main high voltage relay of a hybrid vehicle including high voltage parts, by smoothly driving high voltage parts, such as an electric oil pump and an air conditioner which is driven with high voltage, even when the main high voltage relay of the hybrid vehicle is turned off.

In one aspect, the present disclosure provides a fail-safe method for high voltage parts in a hybrid vehicle, including: determining whether or not a high voltage main relay is turned off, and when the high voltage main relay is turned off, charging a voltage into a direct current (DC) link using a counter electromotive force generated in a motor generator linked with a revolution of an engine, and performing voltage control such that the voltage of the DC link is uniformly maintained using an inverter for the motor generator.

In an exemplary embodiment, the performing of the voltage control may include controlling the inverter so as to receive a torque command from a voltage controller for emergent driving and output a torque according to the torque command.

In another exemplary embodiment, in the performing of the voltage control, the voltage controller may be configured to generate a regenerative torque command when a current detected voltage value of the DC link is smaller than a target voltage value of the DC link, and generate a driving torque command when the current detected voltage value of the DC link is larger than the target voltage value of the DC link.

In still another exemplary embodiment, the performing of the voltage control may include: determining whether or not the inverter is controllable, and performing the voltage control using the inverter when the inverter is controllable or charging a voltage of the DC link through diode regeneration when the inverter is uncontrollable.

In yet another exemplary embodiment, the charging of the voltage of the DC link may include charging a counter electromotive force generated by the revolutions per minute (rpm) of the engine raised by a dualized transmission map into the DC link upon emergent driving when the high voltage main relay is turned off.

In still yet another exemplary embodiment, the performing of the voltage control may include uniformly maintaining the voltage of the DC link at a predetermined reference voltage within a range of about 200V to about 300V.

In a further exemplary embodiment, the fail-safe method may further include driving the high voltage parts through a power of the DC link that is voltage-controlled.

In another aspect, the present disclosure provides a fail-safe apparatus for a high voltage part in a hybrid vehicle, including: a first motor generator connected to an engine via a clutch, a first inverter connected to the first motor generator, a second motor generator directly connected to the engine, and a second inverter connected to the second motor generator. The fail-safe apparatus includes a voltage controller configured to order a switched torque command to the second inverter when the high voltage main relay is turned off, and the voltage controller is configured to control a voltage of a direct current (DC) link according to the torque command of the voltage controller so as to uniformly maintain the voltage of the DC link using the second inverter, and drive the high voltage parts through power of the DC link that is voltage-controlled.

In an exemplary embodiment, the second inverter may be controlled by the torque command from the voltage controller, and the voltage controller may be configured to generate a regenerative torque command when a current detected voltage value of the DC link is smaller than a target voltage value of the DC link and generate a driving torque command when the current detected voltage value of the DC link is larger than the target voltage value of the DC link.

In another exemplary embodiment, the voltage controller may be configured to uniformly maintain the voltage of the DC link at a predetermined reference voltage within a range of about 200V to about 300V. Additionally, or alternatively, the above-referenced procedures may be executed by a hybrid control unit (HCU).

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
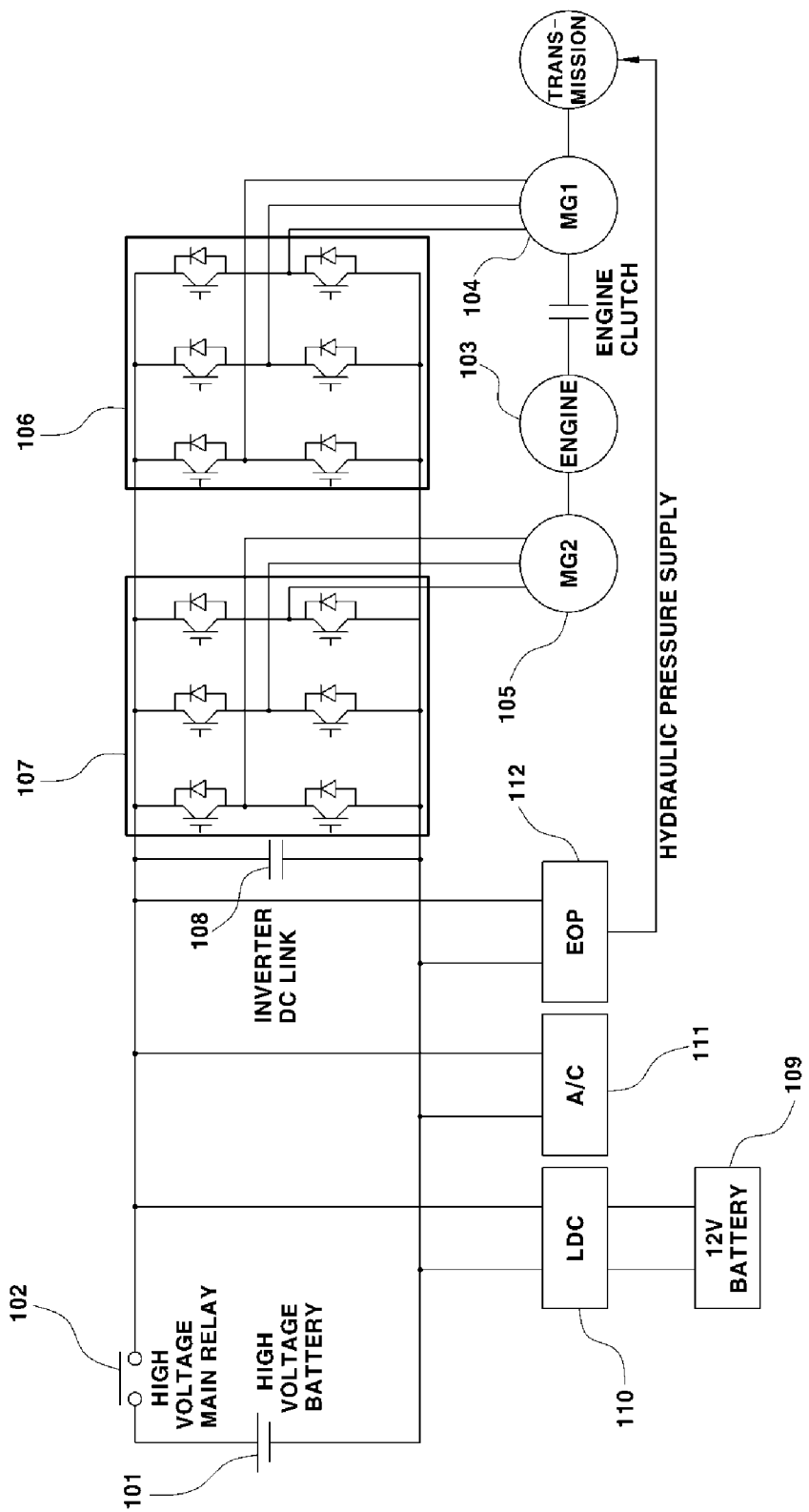
FIG. 1 is a view illustrating a main configuration of a fail-safe apparatus for high voltage parts of a hybrid vehicle according to an embodiment of the present disclosure.

Reference numerals set forth in the Drawings includes reference to the following elements as further discussed below:

101: high voltage battery 102: high voltage main relay
103: engine 104: first motor generator
105: second motor generator 106: first inverter
107: second inverter 108: DC link
109: low voltage (12V) battery 110: Low voltage DC to DC Converter (LDC)
111: air conditioner compressor 112: electric oil pump It should be understood that the accompanying drawings are not necessarily to scale, presenting a somewhat simplified representation of various exemplary features illustrative of the basic principles of the disclosure. The specific design features of the disclosed embodiments, as disclosed herein, including, for example, specific dimensions, orientations, locations, and shapes, will be determined in part by the particular intended application and use environment. Throughout the figures, reference numbers refer to the same or equivalent parts of the present disclosure.

DETAILED DESCRIPTION

Hereinafter reference will now be made in detail to various embodiments of the present disclosure, examples of which are illustrated in the accompanying drawings and described below. While the contents of the disclosure will be described in conjunction with exemplary embodiments, it will be understood that present description is not intended to limit the disclosure to those exemplary embodiments. On the contrary, the invention is intended to cover not only the exemplary embodiments, but also various alternatives, modifications, equivalents and other embodiments, which may be included within the spirit and scope of the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term, components, and/or groups thereof. As used herein, the tern the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller," e.g., voltage controller, HCU, etc., refers to a hardware device that includes a memory and a processor. The memory is configured to store program instructions and the processor is specifically configured to execute said program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art can easily carry out the embodiments.

Although the disclosed embodiments are illustrated as including two motor generators and two inverters for the two motor generators, the present disclosure will not be limited thereto as long as the voltage control of a DC link can be performed using an inverter for a motor generator in a hybrid vehicle.

FIG. 1 is a view illustrating a main configuration of a fail-safe apparatus for high voltage parts of a hybrid vehicle according to an embodiment of the present disclosure. As shown in FIG. 1, the fail-safe apparatus may include an engine 103 for driving a vehicle and a first motor generator 104. The engine 103 and the first motor generator 104 may be detachably connected to each other via an engine clutch, and may deliver power to a wheel through a transmission. Meanwhile, the fail-safe apparatus may include a second motor generator 105 directly connected to the engine 103 via a belt. The second motor generator 105 may be configured to directly receive a torque of an engine. Accordingly, the first motor generator 104 may rotate according to the rotation of the wheel upon coasting, in which the engine does not operate, and the second motor generator 105 may rotate according to the rotation of the engine when the engine operates.

In the fail-safe apparatus, when a high voltage main relay 102 connected to a high voltage battery 101 is turned off, rotors in the first motor generator 104 and the second motor generator 105 may rotate to generate a counter electromotive force by a change of the flux of a rotor coil. The counter electromotive force may be charged into a DC link 108. Even when the high voltage main relay 102 is turned off, high voltage parts, such as an air conditioner compressor 111 and a high voltage electric oil pump 112, may be driven using the charge DC link 108 as a power source, which may also operate a Low voltage DC to DC Converter (LDC) 110 to prevent the discharging of a low voltage (12V) battery 109.

In order to control the engine in an exemplary embodiment of the present disclosure, as the transmission map is dualized to control the engine at a predetermined revolution per minute (rpm), a sufficient torque of the engine can be secured, thereby increasing the counter electromotive force from the second motor generator 105. The counter electromotive force generated according to the driving of the first motor generator 104 or the second motor generator 105 may be charged into the DC link 108 through diode regeneration.

The voltage charged into the DC link 108 may be uniformly maintained by a voltage controller (not shown) in consideration of the stability of the driving and output of the high voltage parts. The voltage controller may be configured to order a required torque command to the second inverter 107 only when the high voltage main relay 102 is turned off. In a normal driving condition, the inverter may receive the torque command value by a high-level controller, such as the HCU, and perform current control so as to produce the corresponding current. However, when the high voltage main relay 102 is turned off, the torque command from the high-level controller may be interrupted, and the inverter may be controlled by a torque command generated in the voltage controller.

Accordingly, upon emergent operation when the high voltage main relay 102 is turned off, the second inverter 107 may perform current control so as to receive the torque command value from the voltage controller and produce the corresponding torque. Here, the torque command value can be expressed as Equation (1) below. Specifically, the torque command value may be calculated from a target voltage value of the DC link and a detected value that is an actual voltage of the DC link, and may be calculated by referring to factors such as a rotating angular speed.

$$Te\_ref\_vc = f(VDC\_ref, VDC) \quad (1)$$

wherein Te_ref_vc is a torque command value of voltage controller, VDC_ref is a target voltage value, and VDC is an actual detected voltage value.

Preferably, the torque command value from the voltage controller may be configured to be adjusted according to a difference obtained by comparing the target voltage value of the DC link and the actual detected value of the DC link. That is, the voltage controller may be configured to generate a regenerative torque command for generating a regenerative torque when the current detected value of the DC link voltage is smaller than the target value of the DC link voltage, and generate a driving torque command for generating a driving torque when the current detected value of the DC link voltage is greater than the target value of the DC link value. Accordingly, in this embodiment, the voltage of the DC link 108 can be maintained according to the adjustment of the torque command of the voltage controller, in active response to the variation of the counter electromotive force inputted when the voltage drops at the DC link due to the high voltage parts.

The voltage of the DC link has to be maintained at an appropriate level for the driving of the high voltage parts, and preferably, the voltage of the DC link may be configured to maintain at a predetermined reference voltage within about 200 V to about 300 V, and preferably, about 270 V. An engine that rotates at an rpm of about 1,300 through the dualization of the transmission map achieves the load supply of about 2 kW. However, in this embodiment, when the voltage control is performed at a voltage of about 270 V, the supply load was about 6 kW. Accordingly, it can be verified that the voltage control is improved.

Figure 2:
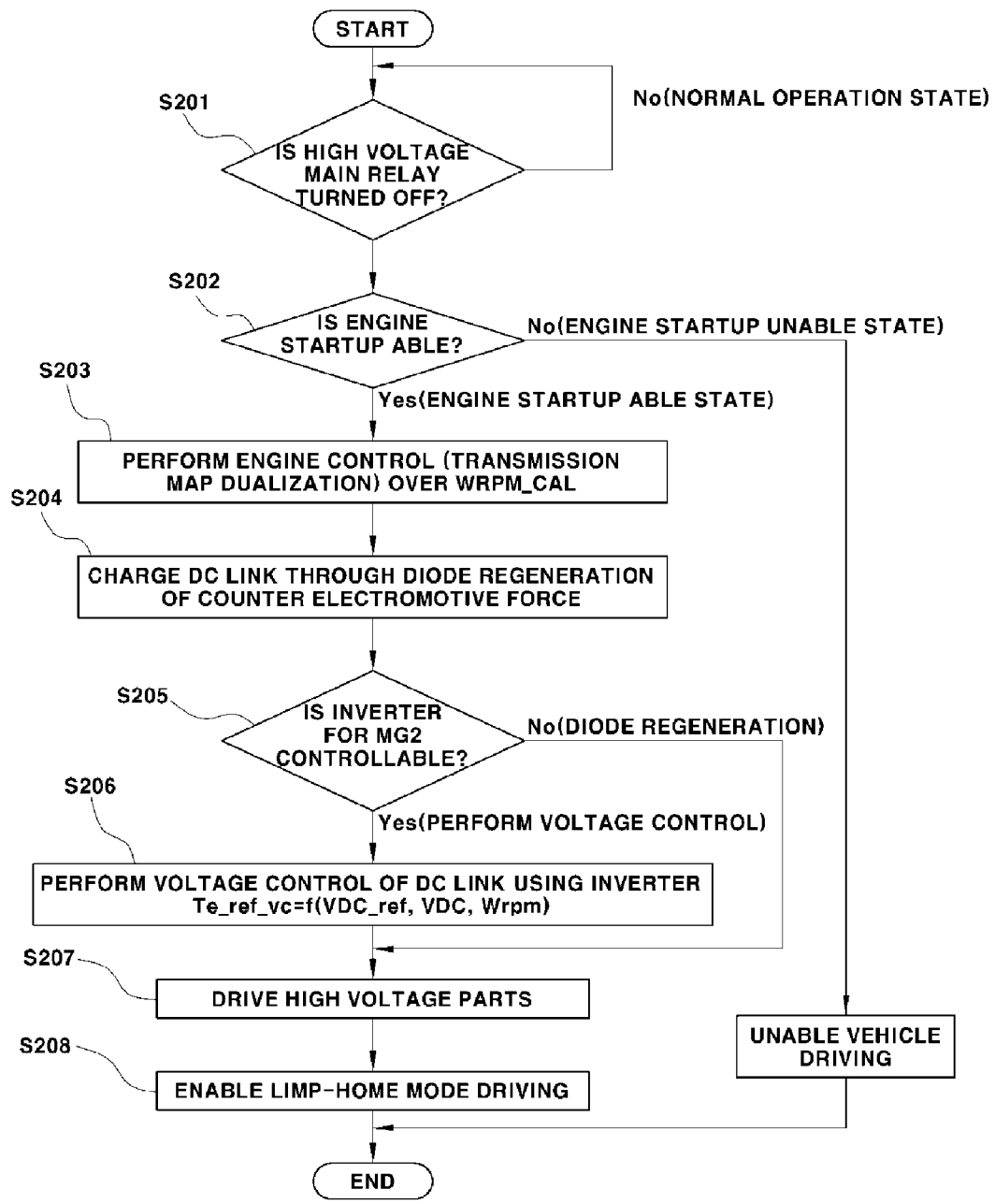
FIG. 2 is a flowchart illustrating a fail-safe method for high voltage parts of a hybrid vehicle according to an embodiment of the present disclosure.

FIG. 2 is a flowchart illustrating a fail-safe method for high voltage parts of a hybrid vehicle according to an embodiment of the present disclosure. As shown in FIG. 2, it may be determined whether a high voltage main relay is turned off (S201). When the high voltage main relay is not turned off, the operation state may be maintained at normal state, but when the high voltage main relay is turned off, the emergent operation may be performed.

In this emergent operation stage, it may be determined whether or not the engine startup is enabled (S202). When the engine startup is determined as impossible, the vehicle driving itself is impossible. Accordingly, an emergent operation mode according to this embodiment may end, and another emergent operation mode according to the impossibility of the engine operation may be performed.

On the other hand, when the engine startup is determined as possible, the engine is controlled at an rpm raised by the transmission map dualization (S203), and the voltage of the DC link may be charged through the diode regeneration of the counter electromotive force generated by such engine rotation (S204). Here, the fail-safe apparatus for high voltage parts in the hybrid vehicle may further include controlling the voltage of the DC link using an inverter.

As shown in FIG. 2, it is determined whether or not the second inverter for the second motor generator is controllable (S205). When the second inverter is controllable, the procedure proceeds to the voltage control. Here, the voltage of the DC link may be controlled by performing the current control such that the second inverter outputs a corresponding torque according to a torque command of a voltage controller (S206).

Next, high voltage parts, except a part causing the turning-off of the high voltage main relay, may be driven through the power of the DC link charged by the voltage control of the inverter (S207). Even in the event of turning-off of the high voltage main relay, driving of limp-home mode may become possible (S208).

Figure 3:
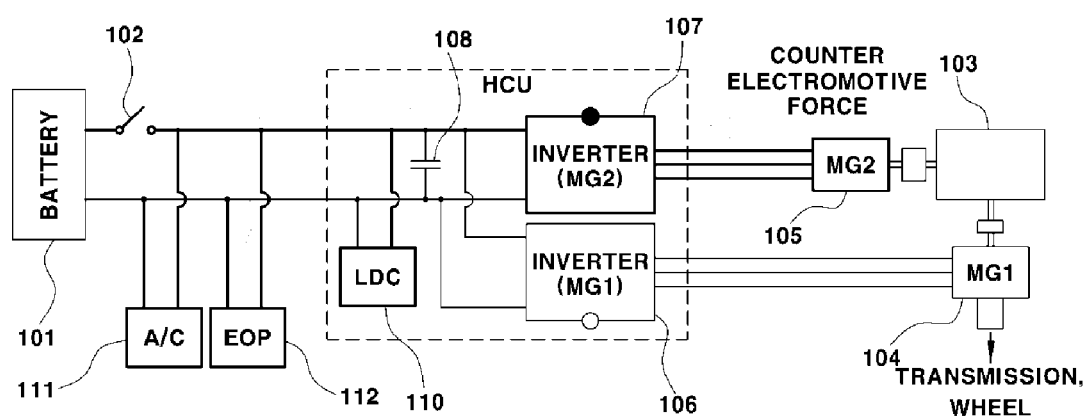
FIG. 3 is a view illustrating a power supply into high voltage parts in a fail-safe apparatus for high voltage parts of a hybrid vehicle according to an embodiment of the present disclosure.

FIG. 3 illustrates emergent driving of high voltage parts of a hybrid vehicle through the process as described in FIG. 2. As shown in FIG. 3, when the high voltage main relay 102 is turned off, a counter electromotive force according to the revolution of the engine may be generated in the second motor generator 105, and may be charged into the DC link 108. Here, the voltage controller (not shown) may perform voltage control on the DC link 108 at a certain level using the second inverter 107. The high voltage parts may be driven by power of the DC link 108 that is voltage-controlled.

Accordingly, in the fail-safe apparatus and method for high voltage parts in the hybrid vehicle according to the embodiment of the present disclosure, since sufficient power for driving the high voltage part can be obtained only by the voltage control of the DC link using the inverter, even when the high voltage main relay 102 is turned off in the hybrid vehicle equipped with the high voltage electronic oil pump, power can be supplied to the high voltage parts, and the emergent driving mode can be implemented.

Also, as the high voltage power supply is enabled, the operation of a low voltage DC converter is enabled, and thus, a low voltage (12V) battery charging is also enabled, thereby increasing a drivable distance upon emergent driving. Furthermore, as the driving of high voltage parts, such as an air conditioner that is unable to operate upon emergent driving, is enabled, the convenience of the emergent driving can be improved.

The contents of the disclosure have been described in detail with reference to exemplary embodiments thereof. However, it will be appreciated by those skilled in the art that changes may be made in these embodiments without departing from the principles and spirit of the appended claims and their equivalents.

What is claimed is:

1. A fail-safe method for high voltage parts in a hybrid vehicle, comprising:
   determining, by a hybrid control unit (HCU), whether or not a high voltage main relay is turned off, and when the high voltage main relay is turned off, increasing a counter electromotive force generated in a motor generator linked with a revolution of an engine by raising the revolutions per minute of the engine and charging a voltage into a direct current (DC) link using the counter electromotive force generated in the motor generator;
   performing, by a voltage controller, voltage control such that the voltage of the DC link is uniformly maintained using an inverter for the motor generator; and
   driving the high voltage parts through power of the DC link that is voltage-controlled,
   wherein the performing of the voltage control includes controlling the inverter so as to:
      receive a torque command from the voltage controller for emergent driving, and output a torque according to the torque command, and
   wherein the torque command from the voltage controller is adjusted by a difference obtained by comparing a target voltage value of the DC link and actual detected value of the DC link such that the voltage of the DC link is maintained by the adjustment of the torque command from the voltage controller.

2. The fail-safe method of claim 1, wherein when performing the voltage control, the voltage controller is configured to:
   generate a regenerative torque command when a current detected voltage value of the DC link is smaller than the target voltage value of the DC link, and
   generate a driving torque command when the current detected voltage value of the DC link is larger than the target voltage value of the DC link.

3. The fail-safe method of claim 1, wherein the performing of the voltage control comprises:
   determining whether or not the inverter is controllable; and
   performing the voltage control using the inverter when the inverter is controllable, or charging a voltage of the DC link through diode regeneration when the inverter is uncontrollable.

4. The fail-safe method of claim 1, wherein the charging of the voltage of the DC link comprises charging the counter electromotive force generated by the revolutions per minute (rpm) of the engine raised by a dualized transmission map into the DC link upon emergent driving when the high voltage main relay is turned off.

5. The fail-safe method of claim 1, wherein the performing of the voltage control comprises uniformly maintaining the voltage of the DC link at a predetermined reference voltage within a range of about 200V to about 300V.

6. A fail-safe apparatus for high voltage parts in a hybrid vehicle, comprising:
   a first motor generator connected to an engine via a clutch;
   a first inverter connected to the first motor generator;
   a second motor generator directly connected to the engine;
   a second inverter connected to the second motor generator; and
   an HCU to determine whether or not a high voltage main relay is turned off;
   a voltage controller configured to generate a switched torque command when the high voltage main relay is turned off;
   wherein the HCU controls a voltage of a direct current (DC) link according to the torque command of the voltage controller so as to uniformly maintain the voltage of the DC link using the second inverter, and drives the high voltage parts through power of the DC link that is voltage-controlled,
   wherein the HCU controls the engine at a raised revolutions per minute of the engine when the high voltage main relay is turned off, and
   wherein the switched torque command from the voltage controller is adjusted by a difference obtained by comparing a target voltage value of the DC link and an actual detected value of the DC link such that the voltage of the DC link is maintained by the adjustment of the switched torque command from the voltage controller.

7. The fail-safe apparatus of claim 6, wherein:
   the second inverter is controlled by the torque command from the voltage controller, and
   the voltage controller is further configured to:
      generate a regenerative torque command when a current detected voltage value of the DC link is smaller than a target voltage value of the DC link, and generate a driving torque command when the current detected voltage value of the DC link is larger than the target voltage value of the DC link.

8. The fail-safe apparatus of claim 6, wherein the voltage controller is further configured to uniformly maintain the voltage of the DC link at a predetermined reference voltage within a range of about 200V to about 300V.

9. A non-transitory computer readable medium containing program instructions for high voltage parts in a hybrid vehicle, the computer readable medium comprising:
  program instructions that determine whether or not a high voltage main relay is turned off, and when the high voltage main relay is turned off, increase a counter electromotive force generated in a motor generator linked with a revolution of an engine by raising the revolution per minute of the engine and charge a voltage into a direct current (DC) link using a counter electromotive force generated in the motor generator; and
  program instructions that perform voltage control such that the voltage of the DC link is uniformly maintained using an inverter for the motor generator; and
  program instructions that drive the high voltage parts through power of the DC link that is voltage-controlled,
  wherein the program instructions that perform voltage control comprise program instructions that control the inverter so as to:
    receive a torque command from a voltage controller for emergent driving, and
    output a torque according to the torque command, and
  wherein the torque command from the voltage controller is adjusted by a difference obtained by comparing a target voltage vlaue of the DC link and an actual detected value of the DC link such that the voltage of the DC link is maintained by the adjustment of the torque command from the voltage controller.

10. The computer readable medium of claim 9, wherein when performing the voltage control, the voltage controller is configured to:
  generate a regenerative torque command when a current detected voltage value of the DC link is smaller than the target voltage value of the DC link, and
  generate a driving torque command when the current detected voltage value of the DC link is larger than the target voltage value of the DC link.

11. The computer readable medium of claim 9, wherein the program instructions that perform voltage control comprise:
  program instructions that determine whether or not the inverter is controllable; and
  program instructions that perform the voltage control using the inverter when the inverter is controllable, or charge a voltage of the DC link through diode regeneration when the inverter is uncontrollable.

12. The computer readable medium of claim 9, wherein the program instructions that charge the voltage of the DC link comprise program instructions that charge the counter electromotive force generated by the revolutions per minute (rpm) of the engine raised by a dualized transmission map into the DC link upon emergent driving when the high voltage main relay is turned off.

13. The computer readable medium of claim 9, wherein the program instructions that perform the voltage control comprise program instructions that uniformly maintain the voltage of the DC link at a predetermined reference voltage within a range of about 200V to about 300V.

* * * * *